United States Patent [19]

Cummings

[11] Patent Number: 4,994,974
[45] Date of Patent: * Feb. 19, 1991

[54] TOUCH SENSITIVE NAVIGATION SYSTEM

[76] Inventor: Elihu C. Cummings, P.O. Box 300, Santa Ynez, Calif. 93460

[ * ] Notice: The portion of the term of this patent subsequent to Jan. 3, 2006 has been disclaimed.

[21] Appl. No.: 270,082

[22] Filed: Nov. 14, 1988

Related U.S. Application Data

[63] Continuation of Ser. No. 870,534, Jun. 4, 1986, Pat. No. 4,796,190.

[51] Int. Cl.⁵ ............................................. G06F 15/50
[52] U.S. Cl. .................................... 364/443; 364/449
[58] Field of Search ............. 364/443, 424.05, 424.01, 364/709.12, 709.13, 443, 449; 235/61 NV; 340/995

[56] References Cited

U.S. PATENT DOCUMENTS

| | | | |
|---|---|---|---|
| 4,156,912 | 5/1979 | Shigeth et al. | 364/443 |
| 4,360,876 | 11/1982 | Giranlt et al. | 364/449 |
| 4,545,023 | 10/1985 | Mizzi | 364/709 |
| 4,642,775 | 2/1987 | Cline et al. | 364/443 |
| 4,731,769 | 3/1988 | Schaefer et al. | 369/6 |
| 4,796,190 | 1/1989 | Cummings | 364/449 |
| 4,827,419 | 5/1989 | Selby, III | 364/443 |
| 4,831,538 | 5/1989 | Cucchiari et al. | 364/443 |

Primary Examiner—Thomas G. Black
Attorney, Agent, or Firm—Tod R. Nissle

[57] ABSTRACT

An improved navigation system for a vehicle. The system includes a microprocessor and memory therefor and permits the pilot of an aircraft or other vehicle to display on a screen a navigation chart showing the position of the vehicle with respect to fixed environmental checkpoints. A compact laser disk comprises the memory. Environmental checkpoints and other navigation data displayed on the screen are stored on the compact disk. The system includes a procedure for inexpensively and quickly updating system memory. The system supersedes navigation chart manuals now utilized by pilots.

1 Claim, 3 Drawing Sheets

TOUCH SENSITIVE NAVIGATION SYSTEM

This is a continuation of application Ser. No. 870,534, filed June 4, 1986, for "NAVIGATION SYSTEM", now U.S. Pat. No. 4,796,190.

This invention pertains to navigation systems for vehicles.

More particularly, the invention pertains to a vehicle navigation system which, when the pilot of the vehicle touches particular points on the surface of a display screen, permits the position of the vehicle and of pertinent fixed environmental checkpoints in a selected geographical area to appear on the screen to visually illustrate the location and bearing of the vehicle with respect to the fixed environmental checkpoints.

In another respect, the invention pertains to a vehicle navigation system including a memory unit which can store and readily update Jeppesen and other conventional navigation charts which are presently reproduced and utilized by aircraft pilots on numerous sheets of paper compiled in a series of manuals, the manuals being continually updated by replacing obsolete sheets with newly printed sheets containing accurate navigation information.

In a further respect, the invention pertains to a navigation system which prevents navigation information currently stored in the system from being updated by an individual unless the individual has a key access component which can be interpreted by the system and which contains an identification code that is accepted by the system.

Aircraft pilots often utilize Jeppesen and other comparable conventional navigation charts. Each Jeppesen chart shows the fixed environmental checkpoints in the immediate geographical area around a particular airport, along with other information which is useful to a pilot. Such charts have, for many years, been compiled in manuals which are continually updated to reflect changes with respect to various fixed environmental checkpoints and other information provided by the charts. Updates for Jeppesen manuals are mailed to pilots every one to two weeks. Removing obsolete charts from the manuals and replacing these discarded charts with new charts provided in the updates requires a substantial amount of time. Furthermore, when a pilot is flying an aircraft, locating a particular navigation chart in a manual can be awkward, particularly if the pilot is occupied with other pressing matters and needs the chart on short notice.

One advantage inherent in the present system of providing new page updates for Jeppesen and other navigation chart manuals is that the company providing the updates has a reasonable amount of certainty that only those persons paying for and receiving the updates are actually utilizing the updates. While a pilot can, if he wishes, obtain and copy the updates received by another pilot, the frequency of the updates and unconventional size of the pages in Jeppesen manuals usually makes paying for the updates more economically practical than attempting to copy the updates.

Accordingly, it would be highly desirable to provide an improved navigation system for aircraft and other vehicles which would permit the ready storage and recall of navigation charts depicting environmental checkpoints and other information concerning selected geographical areas and which would, while protecting the copyright of publishing companies in update information they produce for such charts, permit the update information to be readily incorporated into the charts.

Therefore, it is a principal object of the invention to provide an improved navigation system for vehicles.

A further object of the invention is to provide an improved navigation system which permits information concerning fixed environmental checkpoints in a particular geographic area to be readily obtained by a pilot while his aircraft is either airborne or grounded.

Another object of the invention is to provide an improved navigation system which permits information concerning fixed environmental checkpoints in a particular geographic area to be quickly updated and which enables the publishing company providing the update information to restrict distribution of the information to authorized individuals and companies.

Still a further object of the invention is to provide an improved navigation system of the type described in which data stored in the system can be readily updated by utilizing a key access component concealable on the person.

These and other, further and more specific objects and advantages of the invention will be apparent to those skilled in the art from the following detailed description thereof, taken in conjunction with the invention drawings, in which.

Figure 1:
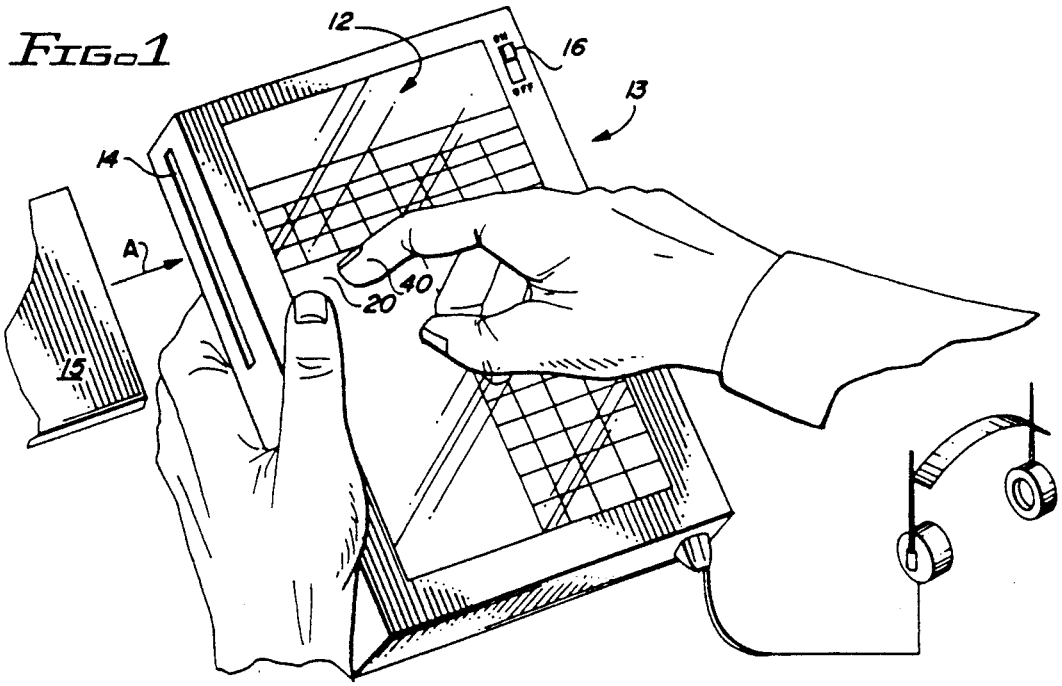
FIG. 1 is a perspective view of a navigation system constructed in accordance with the invention and illustrating the mode of operation thereof.

Briefly, in accordance with my invention, I provide an improved navigation system for a vehicle. The navigation system includes a display screen; memory means for storing navigation chart information for a selected geographical area, the information including fixed environmental checkpoints in the area; sensor means for detecting the touching of the display screen to generate signals representing certain environmental checkpoints and other chart information contained in the memory means for a portion of the selected geographical area; means in communication with the sensor means to recall from the memory means chart information for the portion of the selected geographical area; and, means in communication with the recall means for generating signals corresponding to navigation information in the portion of the selected geographical area to display the information on the screen.

In another embodiment of the invention, I provide an improved vehicle navigation system which includes a display screen; memory means for storing navigation chart information for a selected geographical area, the information including fixed environmental checkpoints in the geographical area; means for storing information to update the navigation chart information stored in the memory means; means for transmitting an electromagnetic radiation signal carrying the update information; sensor means for detecting the touching of said display screen to generate signals representing certain environmental checkpoints and other chart information contained in the memory means for a portion of the selected geographical area; means in communication with the sensor means to recall from the memory means chart information for the portion of the selected geographical area; means in communication with the recall means for generating signals corresponding to navigation information in the portion of the selected geographical area to display the information on the screen; and, means for receiving the electromagnetic radiation signal and processing the signal to direct the update information to the memory means.

In still another embodiment of my invention, I provide an improved vehicle navigation system which includes a display screen; memory means for storing navigation chart information for a selected geographical area, the information including fixed environmental checkpoints in the area; means for storing information to update the navigation chart information stored in the memory means; sensor means for generating signals representing certain environmental checkpoints and other chart information contained in the memory means for a portion of the selected geographical area; means in communication with the sensor means to recall from the memory means chart information for the portion of the selected geographical area; means in communication with the recall means for generating signals corresponding to navigation chart information in the portion of the selected geographical area to display the information on the screen; means for receiving the electromagnetic radiation signal and processing the signal to direct the update information to the memory means; a key access component concealable on the person and carrying identification information required by the system prior to the directing of the update information into the memory means; and, means for reading the key access component to detect the identification information carried thereon. The update information is not directed to the memory means until the reading means detects the required identification information on the key access component.

Turning now to the drawings, which depict the presently preferred embodiments and best mode of the invention for the purpose of illustrating the practice thereof and not by way of limitation of the scope of the invention and in which like reference characters represent corresponding elements throughout the several views, FIGS. 1-5 illustrate a navigation chart system constructed in accordance with the principles of the invention and comprising a portable, hand-held unit including a LCD display screen 12 mounted in a rectangular housing 13. A compact laser disk 15 is inserted in housing 13 through slot 14 formed therein. Compact disk 15 contains information comprising Jeppesen navigation charts of the type displayed on screen 12 in FIG. 3. Disk 15 can also contain information concerning the menu displayed on screen 12 in FIG. 2. The hand-held unit shown in FIGS. 1 to 3 includes a microprocessor control unit 51 which interfaces with display screen 12 and compact disk 15 to determine the particular menu, chart, or other information displayed on screen 12. A laser beam in control unit 51 is used to "read" disk 15. The strings of numbers on disk 15 which are "read" by the laser beam are electronically converted to information which can be used by control unit 51 and, if necessary, shown on screen 12 of display 50.

Housing 13 also carries vehicle position information means 80 for receiving or determining the information necessary to define the geographic location of housing 13. The location of housing 13 with respect to particular fixed geographic checkpoints can be determined from satellite navigation signals, ground based radio navigation stations or self-contained navigation equipment carried in housing 13 or on board an aircraft or other vehicle equipped with the hand-held unit of FIGS. 1 to 3. The hand-held unit can be installed in the instrument panel or at another location in the vehicle. When switch 16 is moved to the "ON" position depicted in FIGS. 2 and 3, the menu shown in FIG. 2 appears on LCD screen 12. When switch 16 is in the "OFF" position, screen 12 is blank. LCD screen 12 is touch sensitive such that when an individual touches his fingertip 40 to screen 12 directly above a particular alphanumeric character(s) displayed on the screen and then touches screen 12 directly above the word "ENTER" 20, the characters "touched" prior to touching screen 12 directly above "ENTER" 20 are entered in computer memory 52 and cause the control unit 51 to select from memory 52 the particular navigation chart or other data identified by the character or character combination directed into computer memory 52 by touching screen 12 above "ENTER" 20. Control unit 51 then causes this particular chart or other data to be produced on screen 12. For example, if after switch 16 is moved to the "ON" position and the menu of FIG. 2 appears, an individual touches screen 12 above the FIG. 2 appears, an individual touches screen 12 above the letters "J" (designating Jeppesen chart), "B" 16, "I" 17, "S" 18, "B" 16, "E" 24, "E" 24, "SPACE" 19, "A" 21, "Z" 22 and "ENTER", control unit 51 searches memory 52 for the Jeppesen chart for Bisbee, AZ and, on locating the chart, causes the menu of FIG. 2 to disappear from screen 12 and the Jeppesen chart shown in FIG. 3 to appear.

Figure 2:
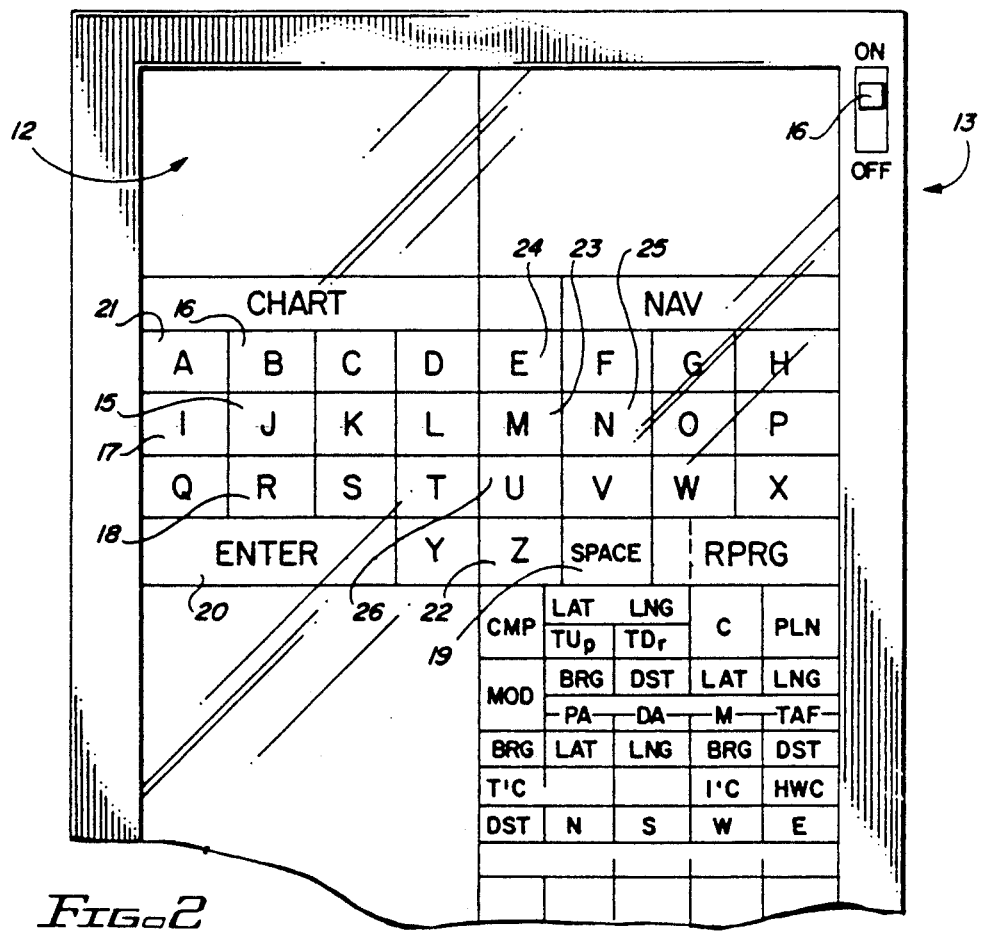
FIG. 2 is a top view of the system of FIG. 1 illustrating a data input menu displayed on the screen of the apparatus.

The menu depicted in FIG. 2 is the primary menu. Other menus can be made to appear on screen 12 by touching screen 12 above selected alphanumeric characters. For instance, if screen 12 is touched above the lined off areas "M" 24, "E" 24, "N" 25, "U" 26, "A" 21, and "ENTER" 20, then control unit 51 removes the primary menu of FIG. 2 from screen 12 and causes supplemental MENU A (not shown) to appear on screen 12. Various other desired alphanumeric character designations can be programmed into unit 51 to call up particular navigation chart data, to use the unit of FIGS. 1 to 3 as a calculator, to cause the particular position of the vehicle carrying the hand-held unit to be displayed on screen 12 either pictorially or in written description, etc.

Figure 3:
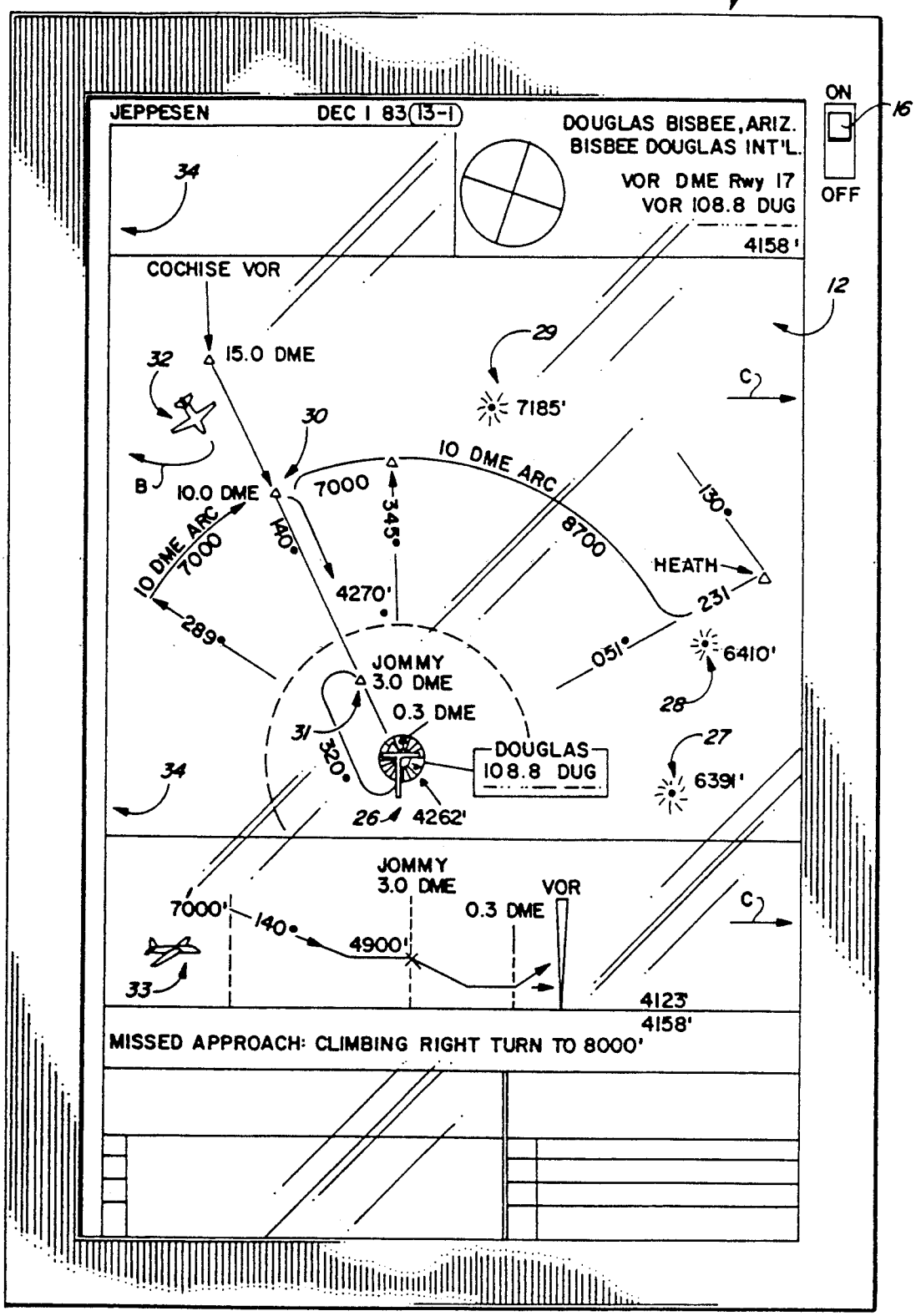
FIG. 3 is a top view of the system of FIG. 1 illustrating a navigation chart displayed on the screen of the apparatus, the chart being displayed on the screen after appropriate information is entered in the system by touching appropriate portions of the screen above the alphanumeric designations in the menu shown in FIG. 2.

The Jeppesen navigation chart shown in LCD screen 12 in FIG. 3 includes fixed invironmental checkpoints including the Bisbee airport runway 26, mountain peaks 27-29, and DME's 30 and 31. The longitude—latitude position of the vehicle carrying the navigation system of the invention is continually shown 32 on the navigation chart of FIG. 3, along with the altitude 33 of the vehicle. The chart contains other data useful to the pilot of an aircraft passing near the Bisbee area or landing at Bisbee International Airport. Once a particular navigation chart is caused to appear on screen 12, control unit 51 causes the chart to scroll upwardly, downwardly, or laterally to continuously maintain vehicle 32 on screen 12 in relation to nearby environmental checkpoints. Consequently, if vehicle 32 alters the heading shown in FIG. 3 and moves in the direction of arrow B and off of the Bisbee Jeppesen chart, the entire chart begins to scroll off of screen 12 in the direction of arrows C and the chart adjacent the left edge 34 of the Bisbee chart is recalled from memory 52 by unit 51 and begins to appear and scroll onto the left hand portion of screen 12 in FIG. 3. This feature of the invention permits a pilot to always know the position of his aircraft 32 with respect to environmental checkpoints in the geographic area he is overflying.

An important novel feature of the invention is the utilization of compact disk 15 as a read and write memory unit. Compact disk 15 is initially programmed with a set of Jeppesen charts or other data for a particular geographic area. Such charts are presently compiled for pilots in manuals which are periodically updated to reflect the addition or removal of pertinent fixed environmental checkpoints and other data. The manuals are updated by manually removing and discarding selected pages and inserting new revised pages in the manuals. In contrast, in the practice of the invention disk 15 is, when updating is required, removed from housing 13 and, along with a key access compact disk (not shown), taken to a central terminal which is in communication with a central computer containing update information. The central computer communicates with the terminal via telephone line, fiber optic, or other electromagnetic radiation communication means. The key access compact disk contains a code and other information necessary for the terminal to update compact laser disk 15. The key access compact disk is inserted in the terminal first and read by the terminal. The key access disk is then removed and compact disk 15 inserted. If the terminal reads the appropriate code and other information from the key access disk, the terminal then, when disk 15 is installed, confirms that the code contained on compact disk 15 corresponds to that on the key access disk and then writes update information on the portion of the disk 15 containing inaccurate or insufficient data. The terminal can completely erase a portion of the information on laser disk 15 and write completely new information on the erased portion of disk 15. Also, if there is additional unused storage space on disk 15, the terminal can write new information on the unused blank portion of disk 15. After the terminal has updated compact disk 15, the disk is removed and reinserted in slot 14 of housing 13.

The hand-held unit of FIGS. 1 to 3 can be provided with a port for receiving electromagnetic signals from a terminal so that disk 15 or a RAM chip can be updated while in the hand-held unit. In this embodiment of the invention, disk 15 is removed from the hand-held unit and the key access compact disk is installed. The key access disk is read by control unit 51 and the information transmitted to the terminal. The key access disk is removed and disk 15 installed. Data corresponding to the code data on the key access disk is read from disk 15 by control unit 51 and transmitted to the terminal. If the required code data is present on both the key access disk and disk 15, the terminal transmits update information to control unit 51. Unit 51 is provided with the ability to "write" the update information on disk 15 or to enter the update information on a RAM chip or other memory means. Unit 51 selectively inserts the update information on disk 15. Control unit 51 can erase portions or all of the memory on disk 15 prior to entering update information on disk 15. The information contained on the key access disk can be permanently programmed into control unit 51 to obviate the need for a separate key access disk. Control unit 51 can be programmed such that a key access compact disk must be inserted and read prior to utilization by control unit 51 of the information on disk 15. Before utilizing the information on disk 15, the control unit 51 would insure that disk 15 had a code number and other information corresponding to the code information on the key access disk.

As would be appreciated by those of skill in the art, the key access disk can also permit hard copies of disk 15 to be made on a home or PC type computer if, as noted above, the code on disk 15 corresponds to the code on the key access disk.

While screen 12 is presently preferably a LCD screen, gas tube or other flat screen technology can be utilized in the practice of the invention. Screen 12 is preferably fabricated from touch sensitive glass so that a menu displayed on screen 12 can be utilized to enter information in control unit 51 and memory 52 in the manner earlier described. A push button keyboard, telephone push button system or other known system can be incorporated in the system of the invention as a data entry system 53.

Figure 4:
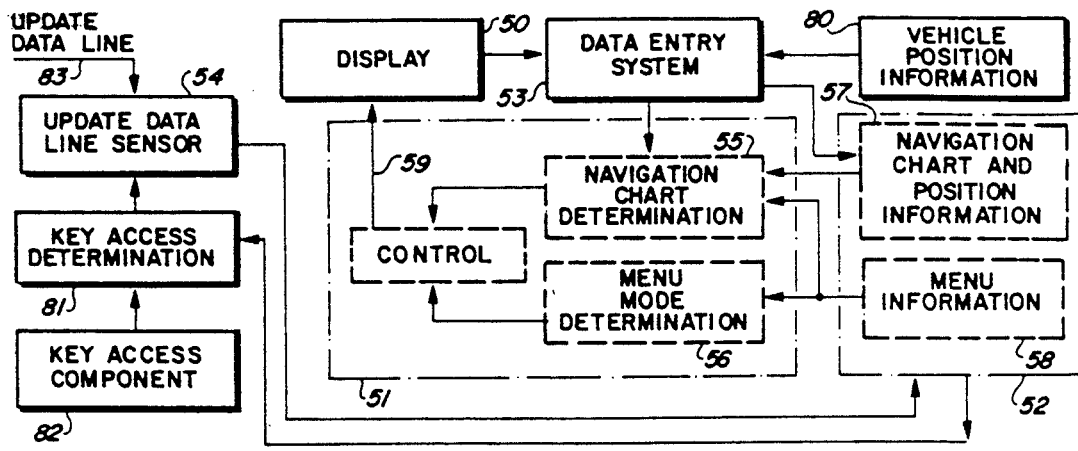
FIG. 4 is a block diagram illustrating a navigation system embodying the present invention; and, FIG. 5 is a block diagram which illustrates a typical program or logic function utilized in accordance with the presently preferred embodiment of the invention.

FIG. 4 is a block diagram which utilizes a preferred embodiment of the navigation system of the invention, the main components of which are a display 50, a microprocessor control unit 51, and a memory 52. A data entry system 53 and a vehicle position information system 80 are provided. As indicated by the dashed lines, control unit 51 performs the dual function of navigation chart determination 55 and menu mode determination 56. Control unit 51 can also determine the position of the vehicle with respect to known environmental checkpoints. Memory 52 contains navigation chart and vehicle position information 57 and menu information 58. Vehicle position information 80 is obtained from navigation satellites or other sources earlier mentioned and is directed to the data entry system 53 which inputs the vehicle position information 57 into memory 52 and control unit 51. The navigation chart information 57 is normally installed in memory 52, i.e., in laser disk 15, prior to the initial installation of memory 52 in the navigation system. However, if desired, data entry system 53 can also direct such information into memory 52. In addition to inputing vehicle position information, data entry system 53 is preferably utilized in conjunction with display 50 to input data defining the particular geographic area for which a navigation chart or other data is desired. The data input by system 53 can also specifically designate a particular chart or other information to be displayed on screen 12. When the system of FIG. 4 is initially activated, control unit 51 makes menu mode determination 56 and generates signals causing the primary menu of FIG. 2 to appear on screen 12 of display 50. If other supplemental menus are selected by entering appropriate information with the primary menu, then control unit 51 makes another mode determination 56 and generates control signals 59 causing the appropriate supplemental menu from menu information 58 to be directed to screen 12 of display 50. When the primary menu or other menu depicted by display 50 is utilized to enter data 53 defining a particular navigation chart or geographic area, then control unit 51 makes navigation chart determination 55 to select the chart from navigation chart and position information 57 corresponding to the particular geographic area and generates control signals 59 which are fed to display 50 to depict the chart on screen 12.

Memory 52 can be any suitable prior art memory unit such as are commonly used in navigation, telecommunication and other types of communication systems. For example, electromagnetic memories such as magnetic, optical, solid state, etc. or mechanical memories such as paper tape can be utilized. A compact laser disk 15 or RAM chip are presently preferred. The presently preferred RAM chip is a Hitachi 41256-150. The RAM chip can be updated over a telephone line or other electromagnetic radiation communication means interfacing between the RAM chip and a central computer containing update information. A Motorola M68000 or comparable electronic microprocessor can be programmed to function as a control unit 51.

Memory 52 can be updated by an update line sensor 54 which receives data over an update line 83. Sensor 54 will not generate signals directing update information to memory 52 until key access determination system 81 confirms that a proper key access component 82, i.e., a key access compact disk or similar component containing a clearance code, has been inserted in the key access determination system 81 and that the clearance code on the key access compact disk corresponds with the clearance code in memory 52.

Figure 5:
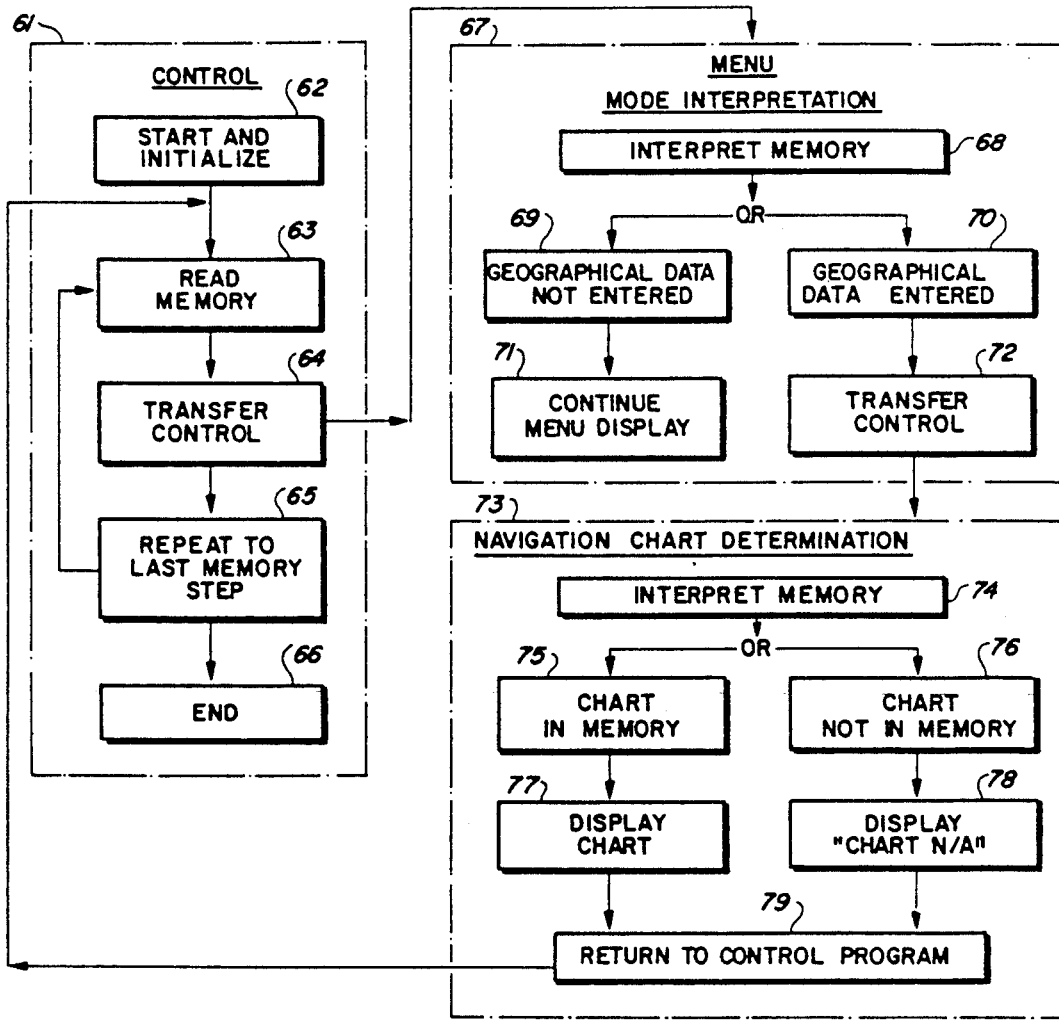

FIG. 5 is a block flow diagram which illustrates a typical program or logic function which is executed by the control unit 51 in determining the particular menu, navigation chart, or other information to be shown on screen 12 of display 50 of FIG. 4. The basic control program 61 consists of commands to "start and initialize" 62, "read memory" 63 and "transfer control" 64 to the menu mode interpretation sub-routine 67.

The menu mode determination 67 consists of commands to "interpret memory" 68 to determine if geographical data defining a particular navigation chart or other desired information has been "entered" 70 or "not entered" 69 via data entry system 53. "Geographical data not entered" 69 is followed by "continue menu display" 71, which causes the primary menu or other menu to be displayed until data defining a desired navigation chart is entered by touching screen 12 in the manner earlier described. "Geographical data entered" 70 is followed by "transfer control" 72 to navigation chart determination sub-routine 73.

The navigation chart determination sub-routine 73 consists of commands to "interpret memory" 74 to determine if the chart identified by the "geographical data entered" 70 is "in memory" 75 or "not in memory" 76. If the chart is "in memory" 75 then control unit 51 generates signal 59 causing screen 12 of display 50 to "display chart" 77. If the chart is "not in memory" 76, the control unit 51 generates signals 59 causing screen 12 to display "CHART N/A", where "N/A" designates "not available". The commands "display chart" 77 and "display 'chart n/a'" 78 are followed by "return to control program" 79. The control program 61, menu mode interpretation sub-routine 67 and navigation chart determination sub-routine 73 are repeated as indicated by the "repeat to last memory step" 65 of the control program 61 followed by an "end" program step 66 which completes execution of the program.

Disk 15, the key access disk, and the RAM chip are transportable and concealable on the person. The power for the hand-held unit of FIGS. 1 to 3 can be supplied by a battery carried in the unit or by any other suitable power means.

As utilized herein, the term vehicle encompasses aircraft, motor cars, boats and other forms of transportation craft for persons or objects.

Control unit 51 can include supplemental memory means in addition to the memory provided by a laser disk 15 or RAM chip. Such supplemental memory means could, for example, include information which control unit 51 requires to make the navigation chart determination 55 or to perform other functions.

Having described my invention in such terms as to enable those skilled in the art to understand and practice it, and having identified the presently preferred embodiments thereof, I claim:

1. A navigation system for a vehicle, including
   (a) a display screen;
   (b) read-write memory means for storing navigation chart information for a selected geographical area, including fixed environmental checkpoints in said area;
   (c) sensor means for detecting the touching of a fingertip to said display screen to generate signals representing certain environmental checkpoints and other chart information contained in said memory means for a portion of said selected geographical area;
   (d) means in communication with said sensor means to recall from said memory means said chart information for said portion of said selected geographical area; and,
   (e) means in communication with said recall means for generating signals corresponding to said chart information in said portion of said selected geographical area to display said information on said screen.

* * * * *